Dec. 25, 1923. 1,478,645
J. W. FUGE
MILKING MACHINERY
Filed Dec. 29, 1922   2 Sheets-Sheet 1
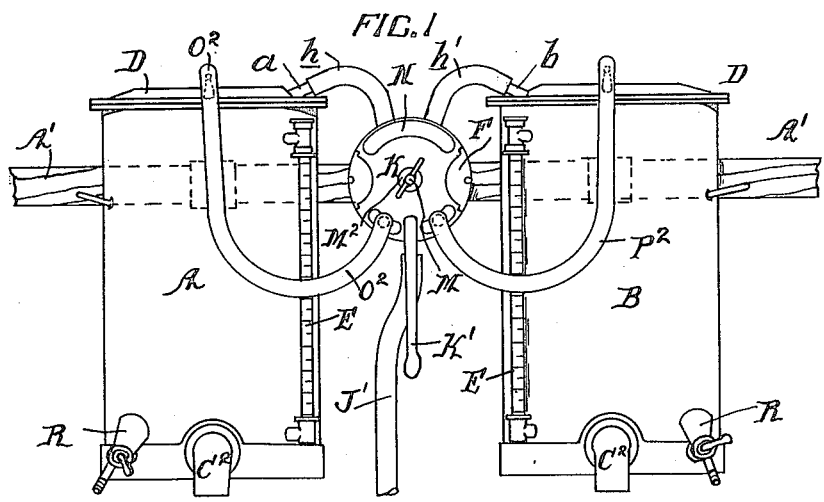
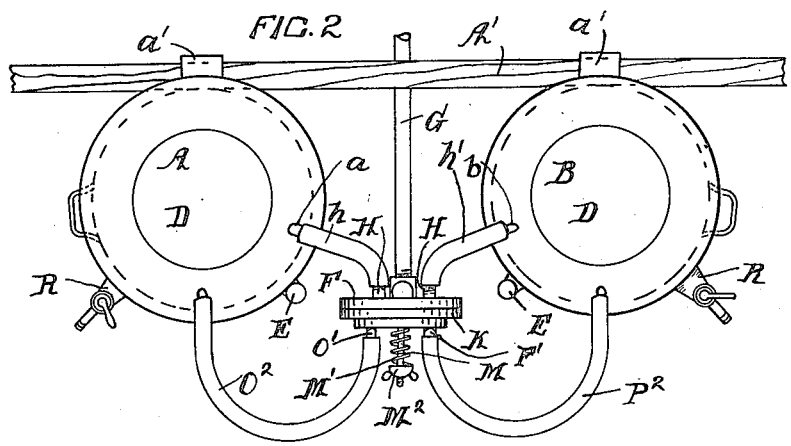
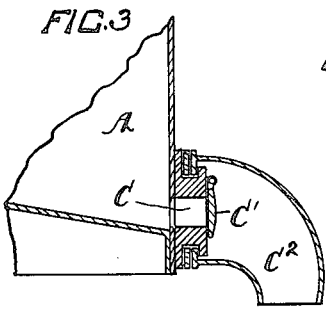
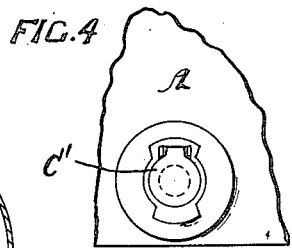
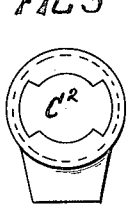
Inventor:
James Wilfred Fuge
By [signature]
  Attorney.

Dec. 25, 1923.
J. W. FUGE
MILKING MACHINERY
Filed Dec. 29, 1922
1,478,645
2 Sheets-Sheet 2
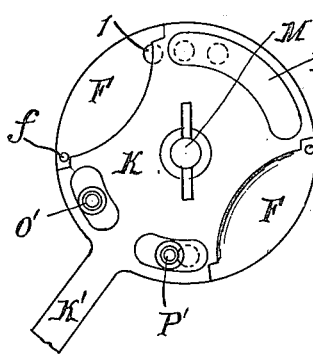
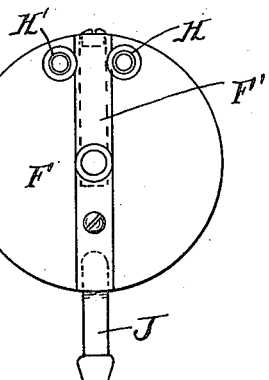
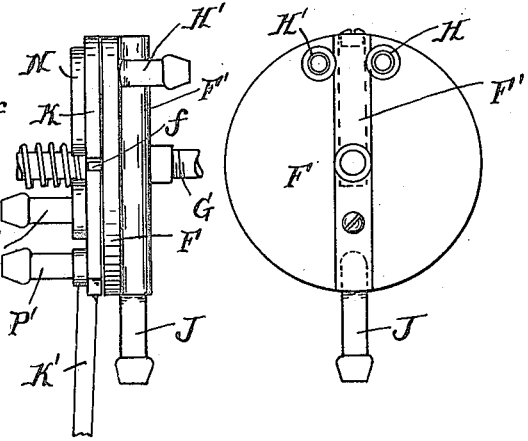
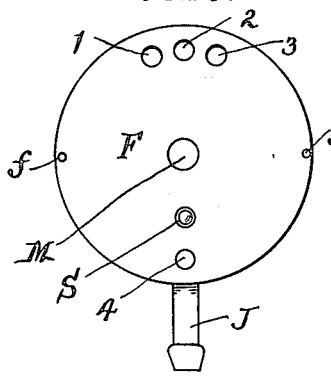
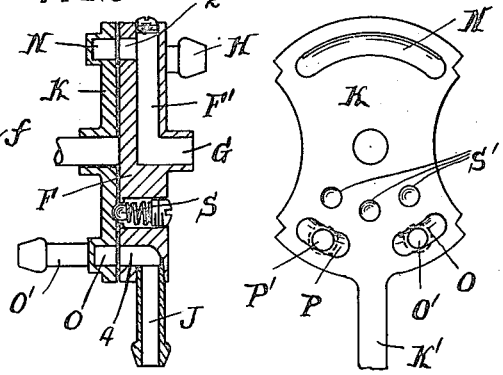
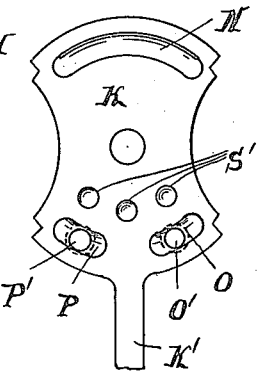
Inventor:
James Wilfred Fuge
By *Attorney*

Patented Dec. 25, 1923.

1,478,645

UNITED STATES PATENT OFFICE.

JAMES WILFRED FUGE, OF FEATHERSTON, NEW ZEALAND.

MILKING MACHINERY.

Application filed December 29, 1922. Serial No. 609,700.

*To all whom it may concern:*

Be it known that I, JAMES WILFRED FUGE, subject of the King of Great Britain, residing at Kahautara Road, Featherston, New Zealand, have invented new and useful Milking Machinery, of which the following is a specification.

This invention relates to improved apparatus that has been devised for use in conjunction with milking machine installations to provide for the milk given by the individual cows being measured and a sample removed for testing purposes. The invention relates particularly to that class of appliance which in working is designed to receive the milk and to discharge it, after it has had the hand strippings added, into a fluming or other conduit by means of which it is conveyed to the milk cans.

The invention has been devised in order to provide improvements in the means whereby such a system may be operated, and is intended to permit of two receiving chambers being used in alternation to receive the milk from different cows, so that in the operation of the apparatus a cow may be milked into the one can, a second cow then connected up to the second can, and while the milking thereof is being carried on, the hand strippings from the first cow taken and introduced into the first can, the total amount of milk measured, a quantity withdrawn as a testing sample, and, finally, the whole then discharged into the fluming. The operations controlling the milking into the can and its discharge therefrom are designed to be carried out by the operation of a single valve apparatus of special form which will control the connections between the respective cans and the vacuum source, and with the teat cups and also between the cans and air by the different movements of the apparatus.

The invention consists in the combination with a pair of cans each made airtight and having a gauge glass attachment, and each provided with a self opening gravity controlled discharge, of special valve apparatus whereby either can may by the operation of the valve, be connected with a vacuum source and with the teat cups of a set, while the other can is connected with the atmosphere and shut off from the vacuum, or whereby both cans may be connected with the vacuum source and cut off from air and the teat cups.

The means for carrying out the invention are illustrated in the accompanying drawings and will be hereinafter fully described in relation to such drawings.

In the drawings:—

Figure 1 is a front elevation, and

Figure 2 a plan of the complete apparatus as set up for work.

Figure 3 is a sectional side elevation of the discharge outlet from each can.

Figure 4 is a face view thereof with the spout removed.

Figure 5 is a back elevation of the spout.

Figure 6 is a front elevation of the control valve apparatus, on an enlarged scale.

Figure 7 is a side elevation,

Figure 8 is a back elevation, and

Figure 9 is a sectional side elevation, thereof.

Figure 10 is a front face view of one of the two members of such valve apparatus.

Figure 11 is a rear face view of the other member thereof.

In carrying out the invention two cans A—B of the necessary capacity and disposed vertically parallel to one another, are arranged a suitable height above the milking floor, as for instance by being hooked by hooks $a'$ over a horizontal bar $A'$. Each can is formed with a discharge opening C in the front at its bottom, and this opening is controlled by a gravity flap valve C' that operates in the well known way to keep the opening closed while vacuum conditions prevail in the can, and to allow of the flap C' swinging out with the weight of milk in the can when the vacuum conditions are destroyed. The flap valve is covered by a downwardly extending spout $C^2$ that is attached to the can by interlocking flange joints, as shown in Figures 4 and 5, so that it may be removed whenever required. Each can also is provided with a removable top cover D making an airtight seal thereon so that facility is afforded for cleaning it out when required. In addition, each can is provided with a gauge glass E to indicate the measure or weight of the milk taken into the can at each milking.

The valve apparatus shown in detail in Figures 6 to 11 and in its working position in Figures 1 and 2, is arranged between the two cans A and B and is suitably retained in position. It comprises a vertically disposed base plate F having a passage F' extending up its back surface from the centre to near the top and then opening through to the front of the base plate by a central port 2 of three concentrically disposed ports 1, 2 and 3 (Figure 10). The said passage F' at its lower end receives a pipe G that extends rearwards and is connected to the vacuum main of the milking system so that the port 2 is in direct communication at all times with such main. This pipe may also be used as the support for the valve apparatus by carrying it through the beam A' on to which the cans are hung.

The respective ports 1 and 2 open into nipples H and H' extending rearwards from the base plate F and these nipples are then connected to the respective cans A and B by rubber tubes $h$ and $h'$ connecting with fittings $a$ and $b$ opening through the respective can covers.

The base plate is also formed with a port 4 disposed vertically and diametrically opposite the port 2. This port 4 opens rearwards into a nipple connection J that extends downwards from the bottom of the plate and receives the end of the ordinary rubber milking tube connection J' with the teat cups.

Combined with the base plate is a valve plate K that is mounted face to face upon the base plate, being journalled to rotate on a screw pin M projecting forwardly from the centre of the base plate and being kept in close facial contact with the base plate by means of the spring M', surrounding the pin, and the thumb nut M² screwed on its outer end to compress such spring. The valve plate is formed with a radially extending handle K' for operating it by turning on the central pin M.

The valve plate is formed, on its inner face, with a groove N (Figure 11) that extends across the upper portion thereof in a line concentric with the ports 1, 2 and 3 of the base plate, and made of sufficient length to extend across all of such ports at the one time, when the valve plate is in the central position with the handle K' extending vertically as shown in Figure 1. It is also formed near its lower edge with two grooves O and P positioned on the respective sides of its central vertical line in a curved line concentric and adapted to register with the port 4 of the base plate and disposed a distance apart such as to leave a solid part of the plate to cover the port 4 when the valve plate is in the said central position. Each of these grooves opens through the front of the plate into a nipple fitting O'—P' and these respective nipples are connected to the tops of the cans on their corresponding sides, i. e. the nipple O' to the top of the can A through the flexible rubber tube O² and the nipple P' to the can B through a similar tube P².

The valve plate, in addition, is so shaped that when turned a certain amount to one side, it will uncover the port 1, and when moved to the other side will uncover the port 3 of the base plate.

These various grooves and ports are so positioned and constructed that they provide for the valve being operated so that when it is in a central neutral position shown in Figure 1 the vacuum main will be connected to both cans A and B through the top groove N and the respective vacuum ports 1 and 3 in the top of the base plate, and the bottom port 4 closed. When the valve plate K is turned to a first position to the left side of this neutral position, the connection of vacuum with both cans will still be maintained, but at the same time a connection will be opened up between the can B and the teat cups through the corresponding groove P in the lower part of the valve plate and the port 4 in the bottom of the base plate, so that milking may proceed into such can. The maintenance of the vacuum in the other can A will then allow for the hand strippings of the cow that has been previously milked into that can, being introduced through a special valve connection provided for that purpose. Then when this has been finished, the movement of the valve plate to a second position in the same direction shown in Figures 6, 7 and 9 will shut off the connection with vacuum on the can A while maintaining it upon the can B in which the milking is being carried out, and also maintaining the connection of such can with the teat cups. This movement will, however, uncover the port 1 in the base plate connecting with the can A, so that the vacuum therein will be broken down and the milk will flow out through the discharge valve C beforementioned. On the milking of the second cow into can B being finished, the valve is moved in the reverse direction to carry out the same operations with regard to the can in which such milking has been effected, and with respect to the other can A in which milking is now to be carried on. The movement of the valve plate to the limit in each direction may be controlled by the stop pins $f$ fixed to project from the base plate F. The movement to the central position and to the first position on each side may be governed by means of the spring controlled ball S fitted to project through the front of the base plate and to engage properly positioned notches S' in the surface of the valve plate.

The discharge openings C of the two cans are arranged so that the milk flowing therefrom will enter the fluming by which it will be conveyed to the cans or other receptacles to receive it. This fluming may, if required, be water cooled by a jacket beneath it and will preferably be covered by a protective covering to prevent contamination of the milk by the surroundings.

Each can is furnished in its bottom with an outlet tap R having a nipple mouth adapted to receive the end of a rubber tube. This tap is provided for the purpose of allowing the hand strippings of the milked cow being drawn into the can after the machine milking has finished, this operation being effected while the said can is maintained in its connection with vacuum through the movement of the valve apparatus to the first position to cut the can off from the teat cups. Then when the whole quantity of milk has been measured by the indication given through the gauge glass, a sample may be withdrawn through the same tap while the milk is being discharged through the movement of the valve apparatus to the second position described, to admit air to the can. If desired, the barrel of this tap may be formed of the enlarged size shown, in order that a measured quantity of milk may be trapped in it and thus allow for a uniform measured sample being obtained at each milking.

I claim:—

1. Apparatus for the purposes herein described consisting in the combination with a vacuum pipe main and with a teat cup connection, of a pair of airtight cans, and a valve mechanism disposed adjacent to the cans and arranged in communication with the vacuum pipe main and with the teat cup connection and with the respective cans, such valve mechanism being so constructed that it may be operated to connect both cans with the vacuum, to connect either can with the teat cups while maintaining the connection of both cans with the vacuum main, and to cut off the other can from vacuum and open it to atmosphere while maintaining the said connections of the first can to vacuum and the teat cups.

2. Apparatus for the purposes herein described and as set forth in claim 1, in which the valve mechanism for controlling the said connections comprises a circular base plate having three ports in its face arranged concentrically in a row, the central port of which is connected permanently with the vacuum main while the side ports are respectively connected with the two cans, said base plate also having a single port in its face that is connected to the teat cups and is positioned diametrically opposite the said central port, and a valve plate mounted to rotate against the face of the said base plate and formed on its inner face with a single groove disposed and adapted to extend across the three ports before mentioned, such valve plate being also shaped to expose each of the outer ports of such three ports when moved across to the limit in one direction, and being formed with a pair of grooves in its inside surface from which connections lead to the respective cans and which grooves are so disposed that either may be brought over the single port in the base plate, or both be cut off therefrom, substantially as specified.

In testimony whereof, I affix my signature.

JAMES WILFRED FUGE.